United States Patent [19]

Morse

[11] 4,037,484
[45] July 26, 1977

[54] DERAILLEUR CONSTRUCTION HAVING FIXED INCREMENT MEANS

[76] Inventor: Milton Morse, 44 Honeck St., Englewood, N.J. 07631

[21] Appl. No.: 597,436

[22] Filed: July 21, 1975

[51] Int. Cl.² ............................................. F16H 7/22
[52] U.S. Cl. .................................. 74/217 B; 74/242; 74/506
[58] Field of Search ..................... 74/217 B, 242, 505, 74/506, 501 R; 280/236, 237, 261

[56] References Cited
U.S. PATENT DOCUMENTS

| 3,362,238 | 1/1968 | Hayashi et al. | 74/217 B |
| 3,453,899 | 7/1969 | Tarutani et al. | 74/217 B |
| 3,974,707 | 8/1976 | Nagano | 74/217 B |

Primary Examiner—Samuel Scott
Assistant Examiner—Allan R. Burke
Attorney, Agent, or Firm—Charles E. Temko

[57] ABSTRACT

A bicycle derailleur mechanism in which the trunnions are moved through an arc in definite increments in cooperation with a detent means, whereby the rider of a bicycle may place the chain on any desired hub-sprocket by moving the trunnions between these preselected locations.

4 Claims, 7 Drawing Figures

DERAILLEUR CONSTRUCTION HAVING FIXED INCREMENT MEANS

BACKGROUND OF THE INVENTION

In my prior U.S. Pat. No. 3,748,916, granted July 31, 1973, there is disclosed a derailleur mechanism in which shifting from one sprocket to another having a numerically higher ratio to a numerically lower ratio is accomplished almost instantaneously by pinching a segment of the sprocket chain against the adjacent larger sprocket. This pinching action eliminates the need to move the derailleur past the larger sprocket and then return to the desired position. It now becomes practical to use a positively positioned derailleur mechanism as hereinafter described.

In the above mentioned patent, the actual means for laterally shifting the pivotal block is conventional, that is to say the pivot block is resiliently pulled against the action of a spring to one end of its potential path of travel by a single cable running to a control means. Conversely, the control means is released to allow the spring to pull the pivot block to the other extreme of its potential arc. This type of actuation was necessary in previous derailleur mechanisms because it was necessary to overshoot the larger sprockets in order to cause the chain to shift from smaller to incrementally larger sprockets. Upon completion of my work with the "pinch effect," I found that I no longer had to overshoot when shifting the chain from the smaller to the larger sprockets. According, I was able to concentrate upon an incrementally detented chain-shifting derailleur.

SUMMARY OF THE INVENTION

Briefly stated, the invention contemplates the provision of a derailleur mechanism, the trunnion structure of which is provided with detenting means for indexing the trunnions to predetermined positions corresponding to the proper engagement of the sprocket chain with selected hub sprockets, and cable means for positively moving the trunnions to detented position in either direction. A double length of cable will now be used for shifting the trunnions to any of the desired proper locations, as contrasted with the usual single cable and trunnion spring means employed in conventional constructions.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 4:
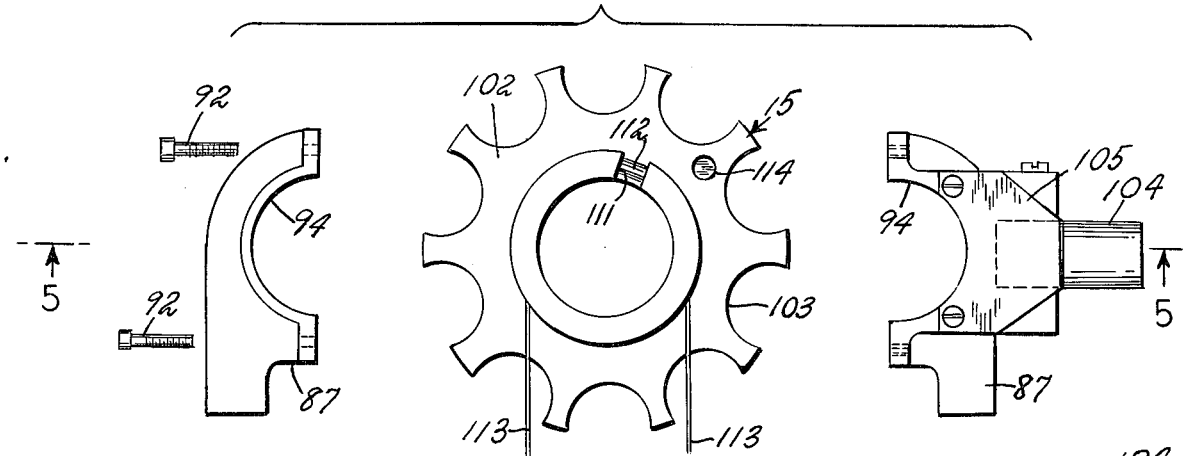
FIG. 4 is an exploded view in elevation of the control means forming part of the embodiment.
Figure 5:
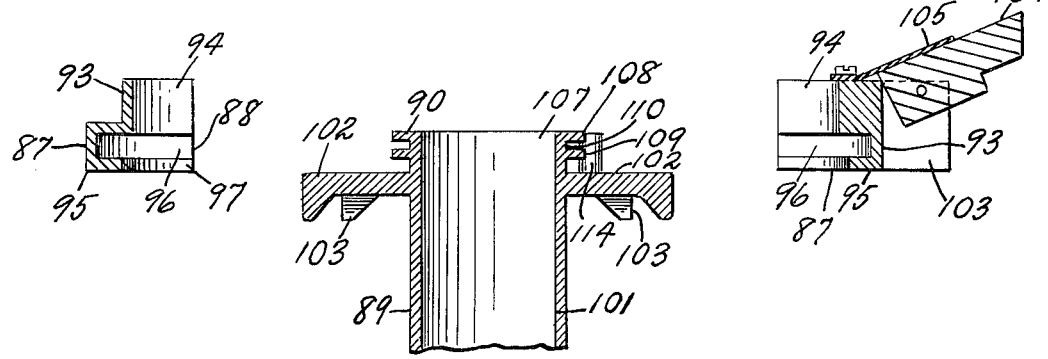
FIG. 5 is a sectional view as seen from the plane 5—5 in FIG. 4.
Figure 6:
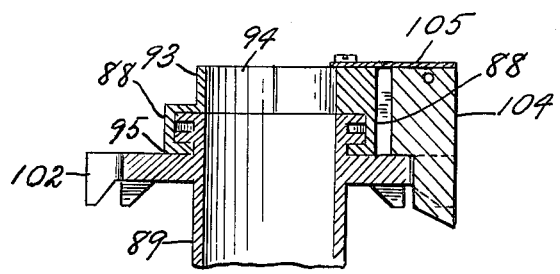
FIG. 6 is a fragmentary sectional view corresponding to FIG. 5 and showing the component parts in assembled condition.
Figure 7:
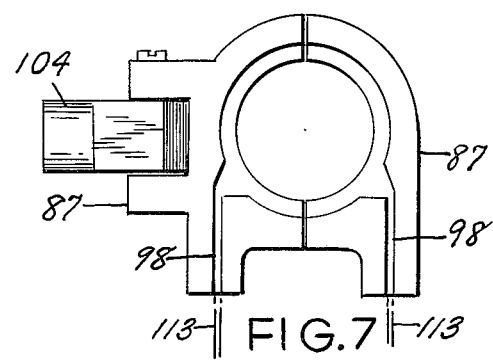
FIG. 7 is a view in elevation of clamping means forming a part of the embodiment, as seen from the opposite side of FIG. 4.

In accordance with the invention, the derailleur mechanism, generally indicated by reference character 10 is of a type illustrated in my prior U.S. Pat. No. 3,748,916. It includes a fixed mounting member 11 interconnected by first and second trunnion members 12 and 13, respectively, to a pivot block 14. The block 14 is shifted under the influence of control means 15 (FIG. 4) under the control of a rider.

The fixed mounting member 11 includes a base 16 defining a bore 17 for a mounting screw (not shown) by means of which the base is secured to a bicycle frame adjacent the rear hub. The base is formed integrally with first and second trunnion supporting members 18 and 19, respectively, each trunnion member having a bifurcated lower portion 20, 21 having through bores 22 engaging pins 23 from which the trunnion members 12-13 depend.

Figures 1, 3:
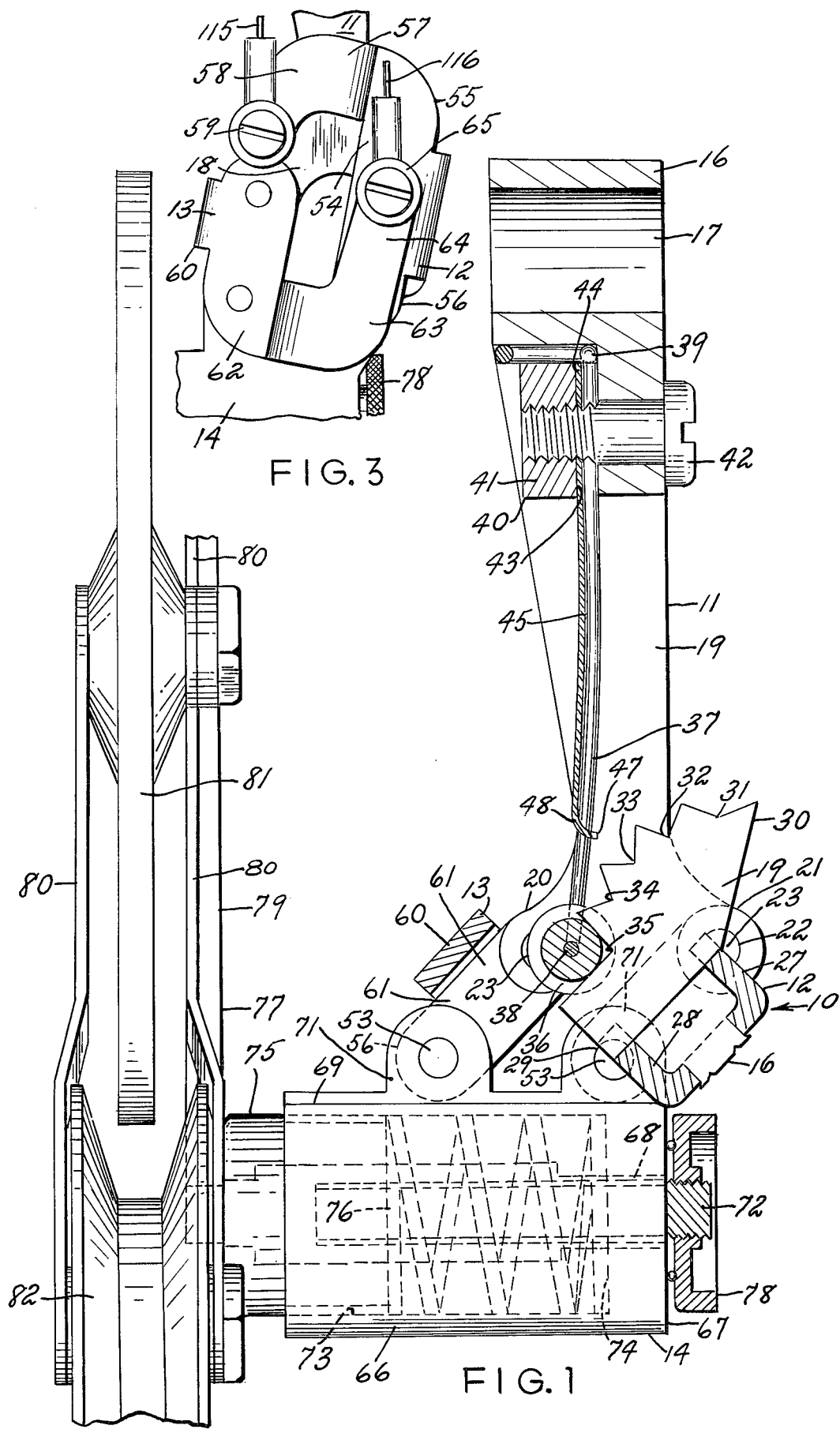
FIG. 1 is a view in elevation, partly in section, of an embodiment of the invention.
FIG. 3 is a fragmentary view in elevation corresponding to the central portion of FIG. 1, and showing certain of the component parts in altered relative position.
Figure 2:
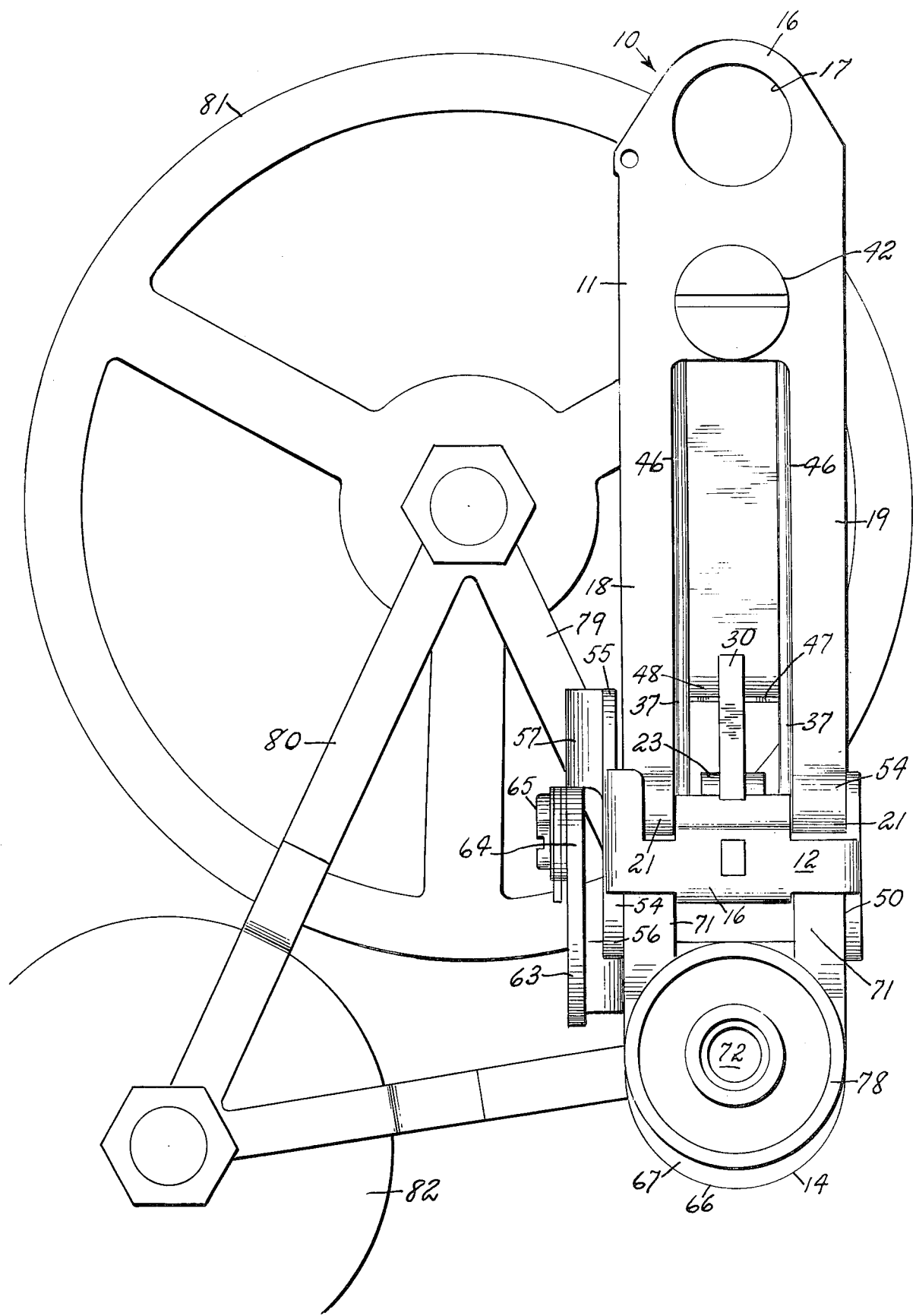
FIG. 2 is a view in elevation, partly in section, as seen from the right hand portion of FIG. 1.

The first trunnion member 12 includes a planar base 16 from which first and second flanges 27 and 28 laterally extend (FIG. 1). The flanges 27-28 support the base 29 of a detenting plate 30, an upper edge of which defines a plurality of serrations or recesses 31, 32, 33, 34 and 35. The recesses cooperate with a detenting roller 36 mounted on spring fingers 37, the lower ends 38 of which form an axle-like support therefor. The upper ends 29 are maintained fixed by a clamp member 40 including a nut portion 41 and bolt portion 42 defining an interstice 43. The interstice 43 also positions the upper end 44 of a leaf spring 45, the side edges 46 of which overlie portions of the spring fingers 37. An inwardly bent tab portion 47 extends between the fingers 37 from the lower end 48 of the leaf spring 45. Formed integrally with the base 16 is a rearward flange 50 including a first end engaging one of the pins 23 and a second end having a pin connection 53 with the pivot block 14. A forward flange 54 includes a first end 55 and second end 56 performing a similar function. A laterally extending member 57 includes a tip 58 having cable anchoring means 59 thereon.

The second trunnion 13 is generally similar to the first trunnion, and is symmetrically arranged. It includes a base 60, a rearward flange 61, a forward flange 62 having a laterally extending member 63 the end 64 of which includes cable anchoring means 65.

The pivot block 14 is of generally conventional construction, including a cylindrically shaped housing 66, a first end surface 67 of which is penetrated by an axially aligned bore 68. An upper surface 69 includes mounting lugs 71 engaging other of the pins 53. An adjustment screw 72 penetrates the bore 68, and a counterbore 73 extending from a surface 74. The bore 73 engages and supports a pivot bearing 75 and spring 76 which applies torque to a cage 77 in well known manner. Threaded adjustment means 78 adjusts the location of the cage to the middle rear sprocket from which position the same accurately locates the sprocket chain for each position relative to the other sprockets.

The cage 77 may be of any desired type, including an inner frame member 79, an outer frame member 80 supporting first and second idler rollers 81 and 82, respectively, which form conventional chain tensioning means.

The control means 15 is most conveniently located in concentrical relation with respect to a bicycle handlebar (not shown) and is of twist-grip type. It includes a pair of symmetrically configured clamp members 87, guide elements 88 and a rotating element 89 including cable-entraining means 90.

The clamp members 87 are maintained in interconnected relation by screws 92, and include a clamp section 93 defining a bore 94 adapted to surround a bicycle handlebar. A housing section 95 defines an annular recess 96 of larger diameter and a smaller annular recess 97, the former communicating with cable guides 98.

The rotatable element 89 may be integrally molded from synthetic resinous material, and includes a tubular grip 101 and a radially extending detent flange 102 having recesses 103 cooperating with a pivotally mounted latch member 104 positioned by a flat spring 105. The shape of the latch member 104 is such that the spring 105 will maintain the latch 104 either in disengaged or engaged condition relative to the flange 102, as desired.

The cable-entraining means 90 is positioned at an end 107 of the grip 101 and includes first and second flanges 108, 109 defining a groove 110 therebetween. The groove 110 includes a recess 111 corresponding in configuration to a cable clamp 112 medially positioned on cable 113 to prevent slippage. Stop means 114 limits rotation of the grip 101 relative to clamp means 87. The two ends 115, 116 of the cable 113 are engaged by means 65 and 59 on the first and second trunnion members 12 and 13.

Operation of the device, under the control of the rider, is analagous to that in conventional derailleur mechanisms. However, as contrasted with conventional construction, the trunnions are positively moved, depending upon the desired direction by exerting tension on either one end or the other end of the cable sufficient to dislodge the detenting plate and detenting roller 30, 36 whereby the cage 17 is shifted in desired lateral direction. As the detenting means re-engages, this can be sensed by a change in tension communicated to the grip 101, whereby the rider is advised that a shift has taken place. While the "pinch" action between the chain and the next adjacent larger sprocket is taking place, the detent mechanism has passed from one recess to the other, even though not fully seated, so that instantaneous adjustment on the part of the rider is actually possible. The latch member 104 may, if desired, be eliminated, with a corresponding loss of function, or may be modified to include means for locking the derailleur only in the case of engagement of the lowest numerical ratio. I wish it to be understood that I do not consider the invention limited to the precise details of structure shown and set forth in this specification, for obvious modifications will occur to those skilled in the art to which the invention pertains.

I claim:

1. In a bicycle chain derailleur mechanism including a relatively fixed mounting member adapted to be secured to a portion of a bicycle frame, a pivot block supporting chain-entraining means, and shiftable laterally of said mounting member to result in moving a continuous segment of a bicycle chain from one hub sprocket to another, first and second parallel trunnions interconnecting said fixed mounting means and said pivot block, the improvement comprising: a generally planar detenting plate supported on one of said trunnions for arcuate movement therewith, said plate having a plurality of detenting recesses arranged in spaced increments corresponding to arcuate displacement of said one of said trunnions in moving said pivot block to predetermined positions to locate said entraining means in co-planar relation relative to given hub sprockets; and a resilient movable detenting member carried by said fixed mounting member and adapted to selectively engage one of said detenting recesses upon movement of said trunnions; whereby said pivot block is resiliently locked into one of said predetermined positions.

2. Structure in accordance with claim 1, including cable means attached to at least said one of said trunnions to shift said trunnions against the resilient detenting action of said detenting member and detenting plate.

3. Structure in accordance with claim 2, in which said cable means includes a single length of looped cable, the free ends of which are attached one to each of said first and second trunnions; and distally located control means engaging a medially looped segment of said cable for selectively applying tension upon one of said trunnions.

4. Structure in accordance with claim 3, said last mentioned means including a rotating handle having means entraining said cable, and means for locking said handle in fixed rotational position corresponding to engagement of a detenting position on said detenting plate with said resilient detent member.

* * * * *